(12) United States Patent
M (10) Patent No.: US 12,288,359 B2
(45) Date of Patent: Apr. 29, 2025

(54) METHOD FOR ADVISING PLACEMENT OF A SPEAKER SET IN A ROOM, AND SYSTEM IMPLEMENTING THE SAME

(71) Applicant: Top Victory Investments Limited, Hong Kong (HK)

(72) Inventor: Sunil M, Karnataka (IN)

(73) Assignee: TOP VICTORY INVESTMENTS LIMITED, Hong Kong (HK)

(*) Notice: Subject to any disclaimer, the term of this patent is extended or adjusted under 35 U.S.C. 154(b) by 303 days.

(21) Appl. No.: 18/186,684

(22) Filed: Mar. 20, 2023

(65) Prior Publication Data

US 2024/0303857 A1 Sep. 12, 2024

(30) Foreign Application Priority Data

Mar. 9, 2023 (EP) ..................................... 23160907

(51) Int. Cl.
| | |
|---|---|
| *G06T 7/73* | (2017.01) |
| *G06T 11/00* | (2006.01) |
| *G06V 20/50* | (2022.01) |
| *H04N 7/18* | (2006.01) |
| *H04S 7/00* | (2006.01) |

(52) U.S. Cl.
CPC ................ *G06T 7/74* (2017.01); *G06T 11/00* (2013.01); *G06V 20/50* (2022.01); *H04N 7/183* (2013.01); *H04S 7/303* (2013.01); *G06T 2207/30242* (2013.01)

(58) Field of Classification Search
CPC ......... G06T 7/74; G06T 11/00; G06T 19/006; G06T 2207/30242; G06V 20/36; G06V 20/20; G06V 40/10; G06V 10/22; G06V 20/50; H04R 29/001; H04R 5/02; H04R 9/02; H04R 9/06; H04R 2205/024; H04R 2400/11; H04N 7/183; H04S 7/303
USPC ......................................................... 381/303
See application file for complete search history.

(56) References Cited

U.S. PATENT DOCUMENTS 10,241,667 B2 * 3/2019 Nguyen .................... G06T 7/55
2015/0149943 A1 5/2015 Nguyen et al.

FOREIGN PATENT DOCUMENTS

CN 107801120 A 3/2018

OTHER PUBLICATIONS

Search Report issued to European counterpart application No. 23160907.4 by the EPO on Aug. 22, 2023 (8 pages).

* cited by examiner

*Primary Examiner* — Paul Kim
(74) *Attorney, Agent, or Firm* — HSML P.C.

(57) ABSTRACT

A method is provided for advising placement for a speaker set in a room. A computerized device stores rules of speaker arrangement, acquires interior information of the room based on images of an interior of the room, and determines a seating location and a reference location in the room based on the interior information, so as to generate a speaker placement recommendation with respect to the placement of the speaker set in the room. A wearable display obtains the speaker placement recommendation from the computerized device and displays the speaker placement recommendation in augmented reality or virtual reality.

11 Claims, 9 Drawing Sheets

METHOD FOR ADVISING PLACEMENT OF A SPEAKER SET IN A ROOM, AND SYSTEM IMPLEMENTING THE SAME

CROSS-REFERENCE TO RELATED APPLICATION

This application claims priority to European Patent Application No. EP23160907.4, filed on Mar. 9, 2023.

FIELD

The disclosure relates to a speaker set, and more particularly to a method for advising placement of a speaker set in a room.

BACKGROUND

Users of audio equipment may follow documents (e.g., user manuals) provided by speaker vendors or relevant organizations to position speakers in order to optimize audio experience. However, when placing the speakers in a room, users will have to read the documents and will need some measurement tools (e.g., rulers, protractors, etc.) to make sure that the speakers are placed at locations that meet recommendations printed in the documents, which is inconvenient and time consuming.

SUMMARY

Therefore, an object of the disclosure is to provide a method and a system that can alleviate at least one of the drawbacks of the prior art.

According to the disclosure, the method is provided for advising placement for a speaker set in a room, and includes steps of: by a computerized device, obtaining speaker data of the speaker set that includes a plurality of speakers, the speaker data indicating a quantity of the speakers, and a speaker type of each of the speakers, wherein the computerized device stores reference rules of arrangement with respect to the speakers of the speaker set; by the computerized device, obtaining a room image set that includes one or more images relating to an interior of the room, and acquiring interior information of the room based on the room image set; by the computerized device, determining, based on the interior information of the room, a seating location where a user is to stay when listening to sounds outputted by the speaker set in the room, and a reference location that is spaced apart from the seating location in a facing direction that the user is to face when seated at the seating location listening to the sounds; by the computerized device, generating a speaker placement recommendation with respect to the placement of the speaker set in the room based on the reference rules, the speaker data, the seating location and the reference location, the speaker placement recommendation being related to recommended speaker regions for placing the speakers in the room; and by a wearable display, obtaining the speaker placement recommendation from the computerized device, and displaying the speaker placement recommendation with respect to the room in augmented reality or virtual reality.

According to the disclosure, the system is provided for advising placement for a speaker set in a room, and includes a computerized device and a wearable display that is communicatively connected to the computerized device. The computerized device and the wearable display are configured to cooperatively perform the method of this disclosure.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
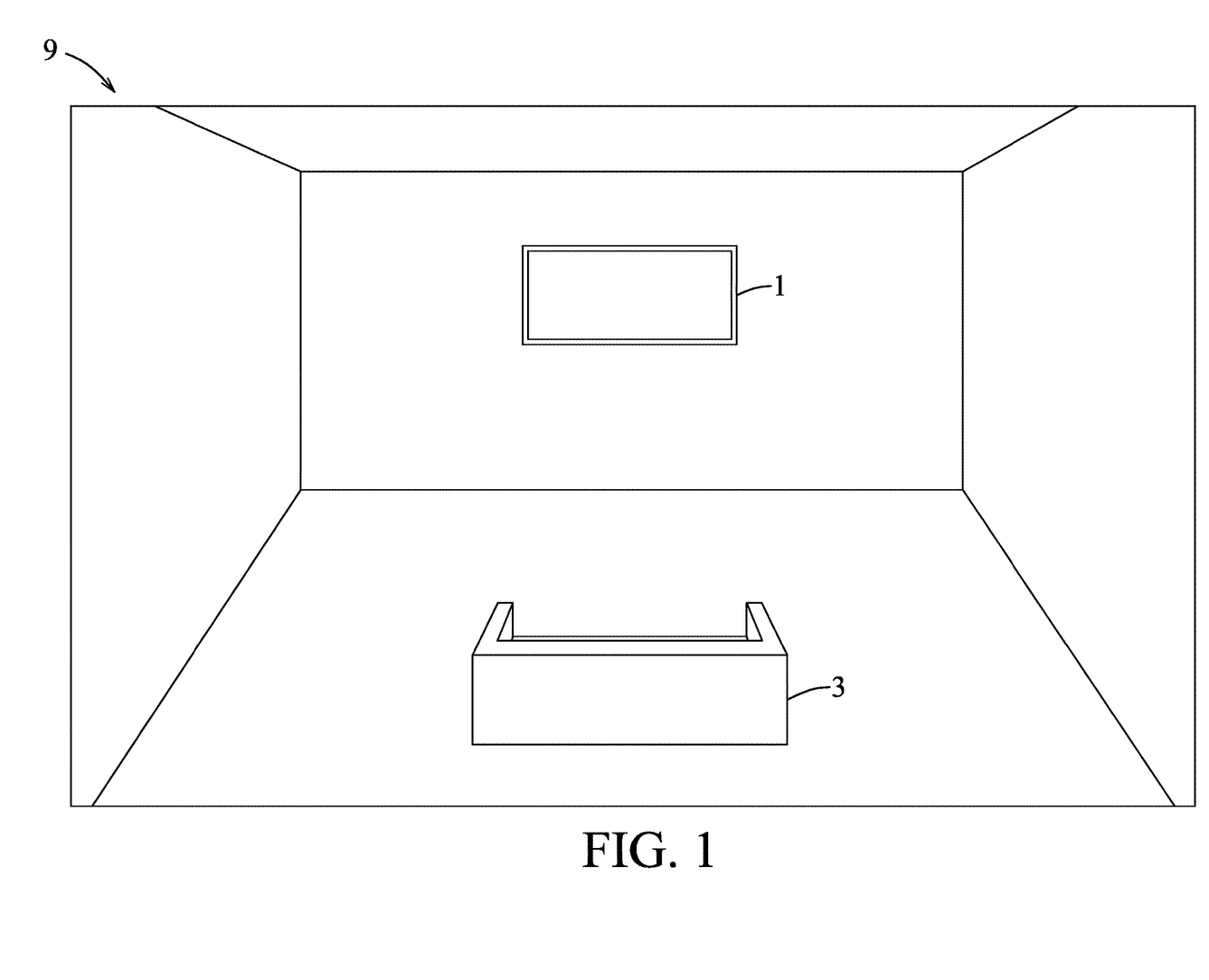
FIG. 1 is a perspective view illustrating a room of a first scenario.
Figure 2:
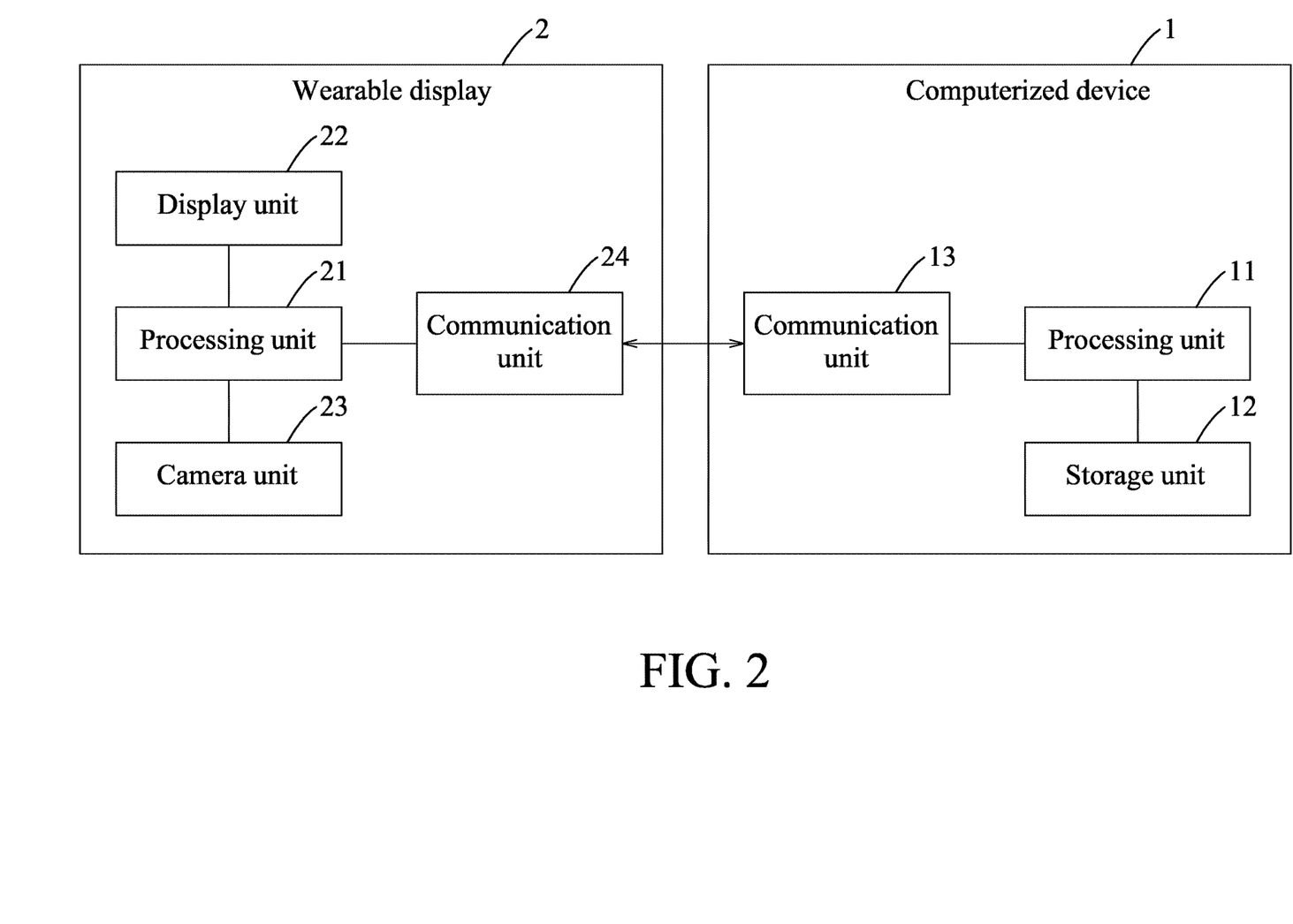
FIG. 2 is a block diagram illustrating an embodiment of a system for advising placement for a speaker set in a room according to this disclosure.

Referring to FIGS. 1 and 2, an embodiment of a system for advising arrangement of a speaker set in a room 9 according to this disclosure includes a computerized device 1 and a wearable display 2. The computerized device 1 includes a processing unit 11, a storage unit 12 and a communication unit 13, and the processing unit 11 is electrically connected to the units 12, 13. The wearable display 2 includes a processing unit 21, a display unit 22, a camera unit 23 and a communication unit 24, and the processing unit 21 is electrically connected to the units 22 to 24. The wearable display 2 may be realized as a virtual reality (VR) headset or an augmented reality (AR) headset, and the display unit 22 may include, for example, one or more display screens to present data provided by the processing unit 21. In a case where the wearable display 2 is a VR headset, the display screen(s) of the display unit 22 may be opaque, blocking out the view to the surroundings from a user who is wearing the wearable display 2. In a case where the wearable display 2 is an AR headset (e.g., smart glasses), the display screen(s) of the display unit 22 may be transparent, so a user who is wearing the wearable display 2 can see the real world through the display screen(s). Each of the processing units 11, 21 may include, for example, one or more processors, one or more controllers, other types of circuits that are capable of data processing, or a combination thereof. The computerized device 1 and the wearable display 2 are communicatively connected to each other through the communication units 13, 24 using wired connection or wireless communication, such as Bluetooth®, Wi-Fi, etc.

Figure 3:
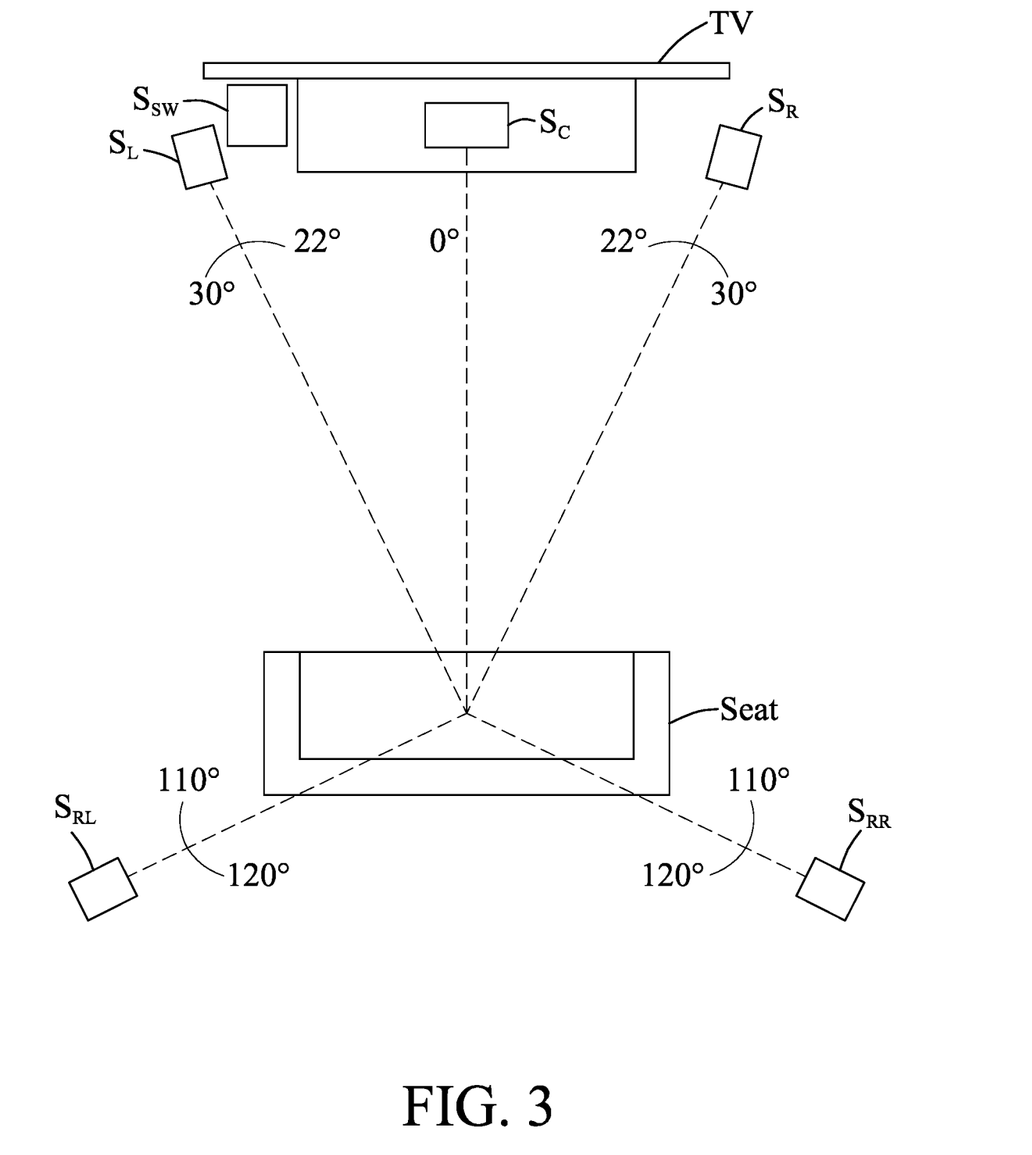
FIG. 3 is a schematic diagram illustrating reference rules of speaker arrangement.

The storage unit 12 may be realized as, for example, a hard disk drive (HDD), a solid state drive (SSD), flash memory, other types of storage components, or any combination thereof. The storage unit 12 stores reference rules of speaker arrangement with respect to various types of speaker sets, such as speaker sets of 2-channel, 2.1-channel, 2.1.2-channel, 3-channel, 3.1-channel, 3.1.2-channel, and so on. FIG. 3 exemplarily illustrates the reference rules of arrangement with respect to a 5.1-channel speaker set that includes a center speaker $S_C$, a left speaker $S_L$, a right speaker $S_R$, a rear-left speaker $S_{RL}$, a rear-right speaker $S_{RR}$ and a sub-woofer speaker $S_{SW}$. The reference rules define, for some specific speakers of the 5.1-channel speaker set (e.g., the speakers $S_C$, $S_L$, $S_R$, $S_{RL}$, and $S_{RR}$), a recommended angular range relative to a facing direction and with respect to a seating location, wherein the seating location is where the user intends to stay when listening to the sounds outputted by the speaker set, and the facing direction is a direction the user is to face when seated at the seating location listening to the sounds outputted by the speaker set. In the illustrative example, the seating location is a center of the seat, and the facing direction is a direction from the center of the seat to a center of the TV. The reference rules define recommended ranges respectively for the center speaker $S_C$ (from 0° to 0°), the left speaker $S_L$ (from 22° to 30° in the counterclockwise direction when facing forward from the seating location), the right speaker $S_R$ (from 22° to 30° in the clockwise direction when facing forward from the seating location), the rear-left speaker $S_{RL}$ (from 110° to 120° in the counterclockwise direction when facing forward from the seating location) and the rear-right speaker $S_{RR}$ (from 110° to 120° in the clockwise direction when facing forward from the seating location).

In this embodiment, the computerized device 1 is realized as a television located in the room 9. In other embodiments, the computerized device 1 may be of any type, for example, the wearable display 2, a desktop computer, a notebook computer, a tablet computer, a smartphone, etc., and this disclosure is not limited in this respect.

Figure 4:
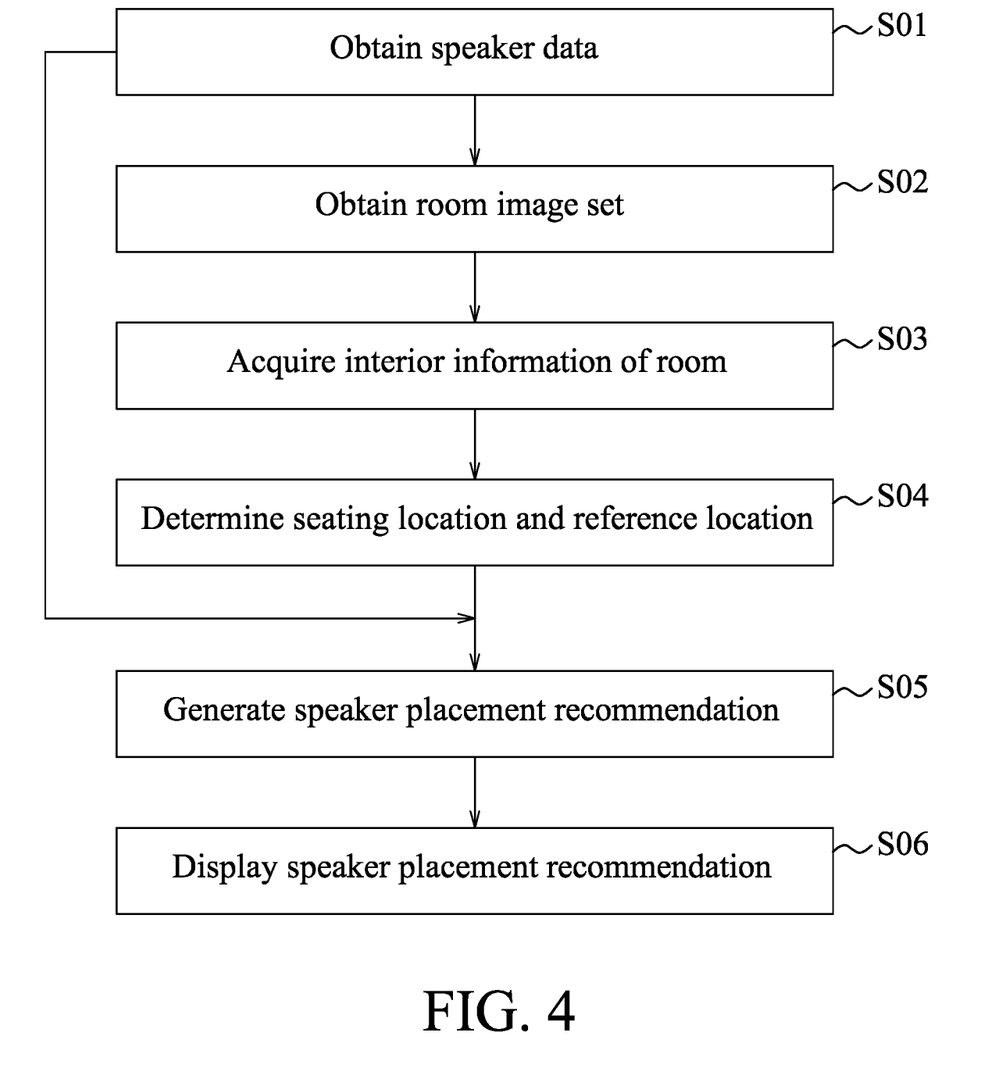
FIG. 4 is a flow chart illustrating steps of an embodiment of a method for advising placement for a speaker set in a room according to this disclosure.

Referring to FIGS. 1, 2 and 4, an embodiment of a method for advising placement for a speaker set in the room 9 according to this disclosure is illustrated to include steps S01-S06.

In step S01, the processing unit 11 of the computerized device 1 obtains speaker data of the speaker set that includes a plurality of speakers. The speaker data indicates a quantity of the speakers, and a speaker type of each of the speakers (e.g., the center speaker, the left speaker, the right speaker, etc.). In some embodiments, the speaker data may be manually inputted by a user. In some embodiments where the speaker set has been electrically connected to the computerized device 1 directly or indirectly (e.g., through an audio amplifier), the processing unit 11 may automatically detect the speaker set to obtain the speaker data or receive the speaker data from the audio amplifier.

In step S02, the camera unit 23 captures one or more images of an interior of the room 9 (referred to as "room image set" hereinafter), and transmits the room image set to the computerized device 1 through the communication unit 24. In other embodiments, the wearable display 2 may omit the camera unit 23 (i.e., the camera unit 23 is not built in the wearable display 2), and, for example, a standalone camera, a smartphone, a tablet computer, a notebook computer, other types of image capturing devices, or a combination thereof, may be used to capture and transmit the room image set, and this disclosure is not limited in this respect.

In step S03, the processing unit 11 of the computerized device 1 receives the room image set through the communication unit 13, and acquires three-dimensional (3D) interior information of the room 9 based on the room image set. For techniques to acquire the 3D interior information of the room 9 based on the room image set, reference may be made to, for example but not limited to, "Shichao Yang, Daniel Maturana and Sebastian Scherer (2016). Real-time 3D scene layout from a single image using convolutional neural networks. 2016 IEEE International Conference on Robotics and Automation," "Yinxiao Li and Stanley T. Birchfield (2010). Image-Based Segmentation of Indoor Corridor Floors for a Mobile Robot. The 2010 IEEE/RSJ International Conference on Intelligent Robots and Systems," or "Zhong-Ju Zhang (2009). Wall, Floor, Ceiling, Object Region Identification from Single Image." In a first scenario as illustrated in FIG. 1, a seat 3 and the computerized device 1 (i.e., the television on a wall) are placed in the room 9, so the room image set would show the seat 3 and the computerized device 1. In such a scenario, the processing unit 11 may identify the seat 3 and the computerized device 1 from the room image set, and thus determine locations of the seat 3 and the computerized device 1 in the room 9. As a result, the 3D interior information may indicate the locations of the seat 3 and the computerized device 1.

In step S04, the processing unit 11 of the computerized device 1 determines, based on the interior information of the room 9, a seating location where a user is to be seated listening to sounds outputted by the speaker set in the room 9, and a reference location that is spaced apart from the seating location in a facing direction that the user is to face when the user is seated at the seating location listening to the sounds. In the illustrative embodiment, the processing unit 11 may make the location of the seat 3 (e.g., a center of an area occupied by the seat 3) as indicated in the 3D interior information serve as the seating location, make the location of the computerized device 1 (e.g., a center of an area occupied by the television) serve as the reference location, and the facing direction is thus a direction pointing from the seating location to the reference location. In some embodiments, the computerized device 1 may display the room image set, so that the user can operate the computerized device 1 to manually select a seating point and a reference point on the image(s) of the room image set, in which case the computerized device 1 would transform the seating point and the reference point respectively into the seating location and the reference location based on the 3D interior information. In some embodiments, the computerized device 1 may create and display a virtual room based on the 3D interior information, allowing the user to operate the computerized device 1 to manually determine the seating location and the reference location. In some embodiments, the user may operate the wearable display 2 to manually determine a seating point and a reference point in augmented reality, and transmit the determinations to the computerized device 1, so the computerized device 1 can transform the seating point and the reference point into the seating location and the reference location based on the 3D interior information. In some embodiments, the wearable display 2 may cooperate with the computerized device 1 to create and present a virtual room in virtual reality based on the 3D interior information, allowing the user to operate the wearable display 2 to manually determine the seating location and a reference location in the virtual room.

Figure 5:
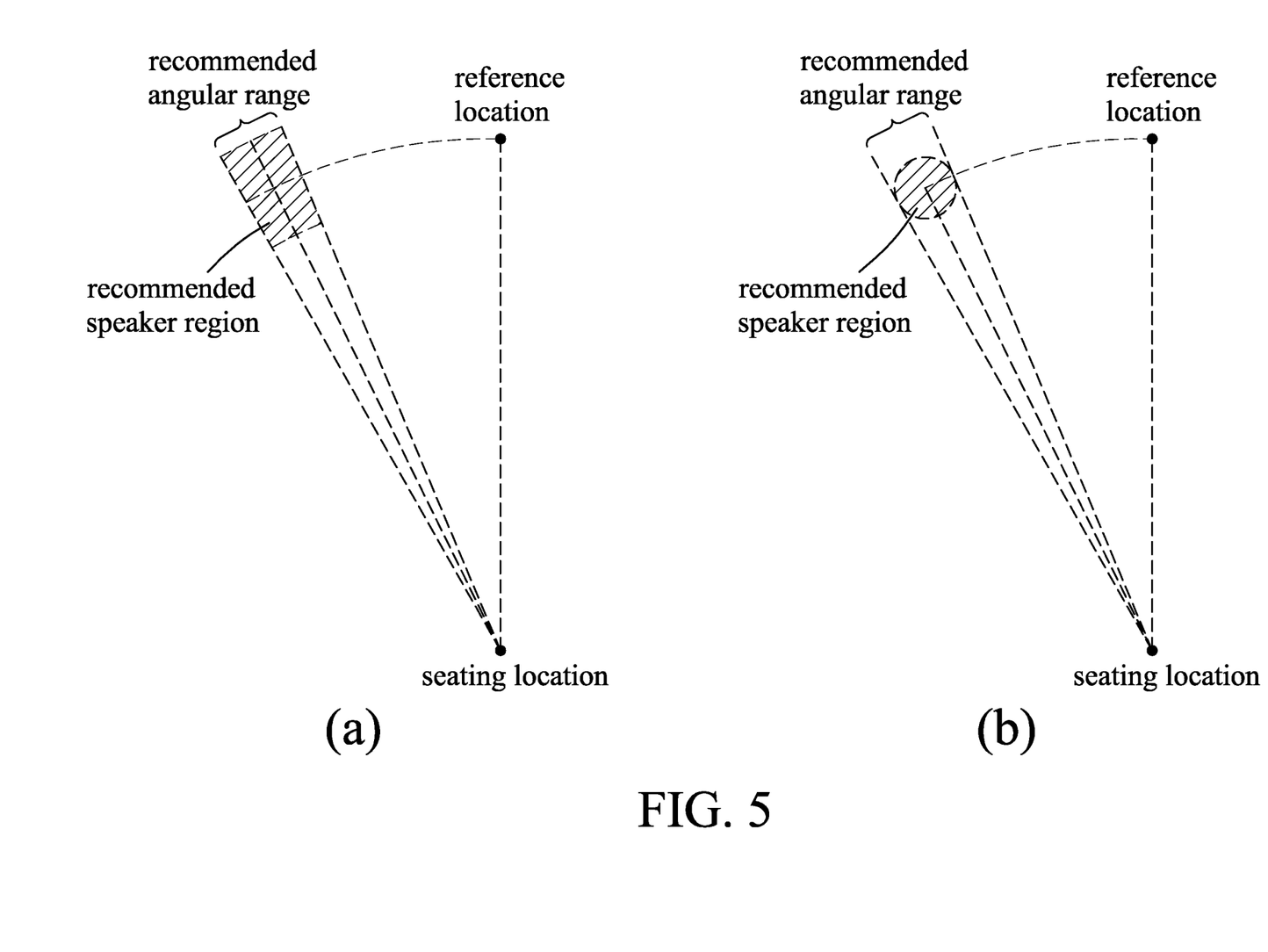
FIG. 5 is a schematic diagram exemplarily illustrating recommended speaker regions that are determined in accordance with some embodiments.

In step S05, the computerized device 1 generates a speaker placement recommendation with respect to the placement of the speaker set in the room 9 based on the reference rules, the speaker data, the seating location and the reference location, where the speaker placement recommendation is related to recommended speaker regions for placing the speakers in the room 9. In one example as illustrated in part (a) of FIG. 5, for one of the specific speakers of a 5.1-channel speaker set, say, the left speaker, the recommended speaker region may be an area spaced apart from the reference location by an angular distance falling within the recommended angular range (e.g., for the left speaker, ranging from 22° to 30° in the counterclockwise direction when facing forward from the seating location) with respect to the seating location as defined for said one of the specific speakers of the 5.1-channel speaker set in the reference rules, and spaced apart from the seating location by a distance falling within a distance range centered on a reference distance (e.g., ±10% of the reference distance), which is exemplified as a distance between the seating location and the reference location in this embodiment. In one example as illustrated in part (b) of FIG. 5, for one of the specific speakers of a 5.1-channel speaker set, the recommended speaker region may be a circular region. A center of the circular region may be spaced apart from the reference location by an angular distance of a center value of the recommended angular range (e.g., for the left speaker, 26° in the counterclockwise direction when facing forward from the seating location) with respect to the seating location as defined for said one of the specific speakers of the 5.1-channel speaker set in the reference rules, and spaced apart from the seating location by the reference distance. A radius of the circular region may be equal to the shortest distance between the center of the circular region and a virtual line that intersects the facing direction at the seating location to form an angle of an upper limit (e.g., for the left speaker, 30° in the counterclockwise direction when facing forward from the seating location) or a lower limit (e.g., for the left speaker, 22° in the counterclockwise direction when facing forward from the seating location) of the recommended angular range. Since a central point of the recommended speaker region is spaced apart from the seating location by a distance equaling the reference distance, and a distance between the boundary and the central point of the recommended speaker region is limited based on the reference rules or the reference distance to be smaller than the reference distance (e.g., 10% of the reference distance as illustrated in part (a) of FIG. 5, or the radius of the circular region as illustrated in part (b) of FIG. 5), the speaker that is located in the recommended speaker region will not be too close to or to far from the seating location, thereby preventing imbalance of the sound volumes to be perceived by the user when seated at the seating location. The recommended speaker region may be defined in various manners, and this disclosure is not limited in this respect. It is noted that, in the illustrative embodiment, since the reference rules do not include rules for the sub-woofer speaker $S_{SW}$ (see FIG. 3), the speaker placement recommendation does not include a recommended speaker region for the sub-woofer speaker, but this disclosure is not limited in this respect.

Figure 6:
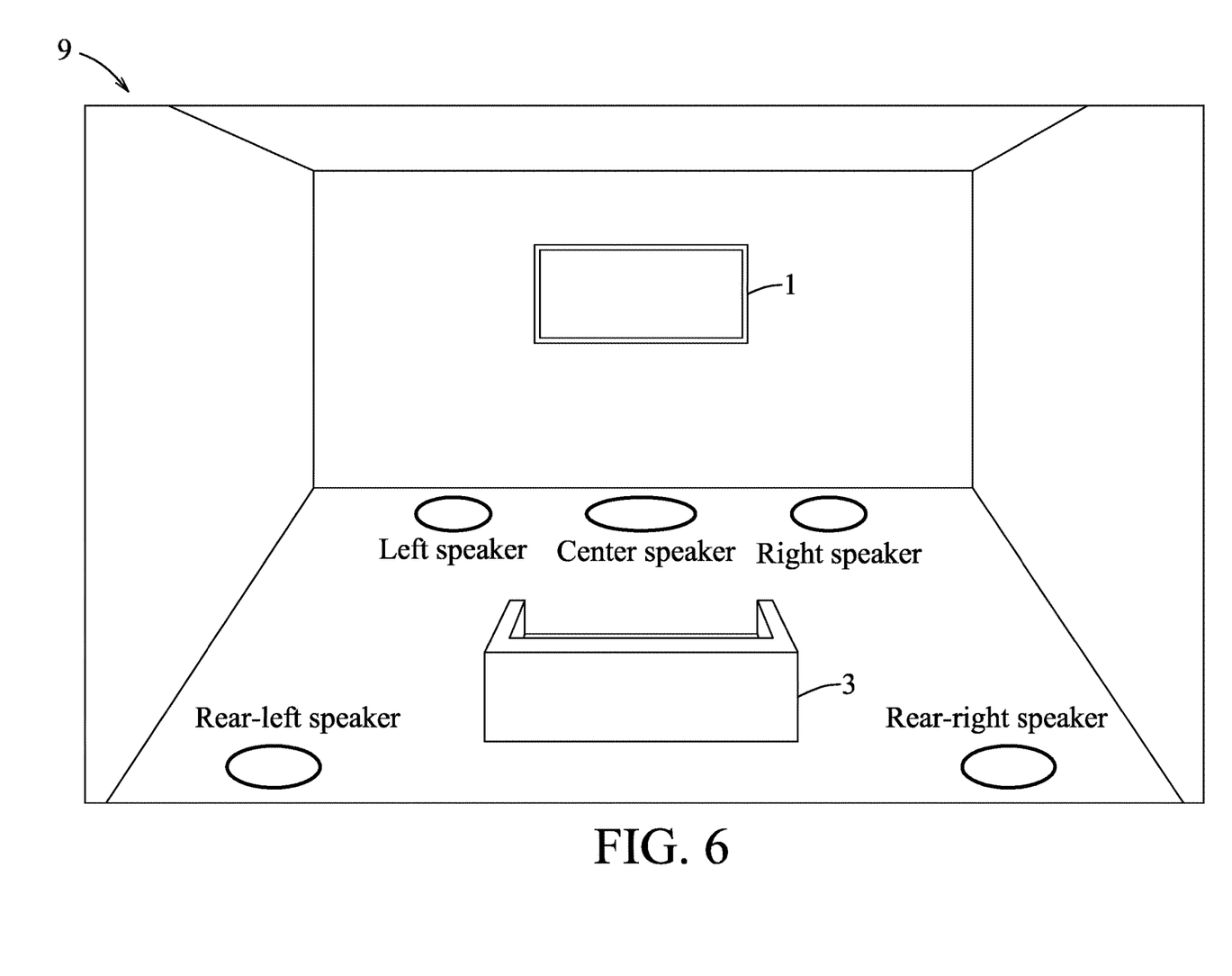
FIG. 6 is a perspective view exemplarily illustrating display of a speaker placement recommendation in augmented reality or virtual reality.

In step S06, the wearable display 2 obtains the speaker placement recommendation from the computerized device 1, and displays the speaker placement recommendation with respect to the room 9 in augmented reality or virtual reality. As exemplified in FIG. 6, the user may see, through the wearable display 2, the room 9 marked with the recommended speaker locations (i.e., encircled regions) for placing the specific speakers in augmented reality, or a virtual room 9 marked with the recommended speaker locations for placing the specific speakers in virtual reality, where the virtual room 9 contains a virtual seat and a virtual display screen that are generated based on the seat 3 and the computerized device 1 as identified in step S03. By virtue of using the wearable display 2 to display the recommended speaker locations in augmented reality or virtual reality, the user may visually perceive the audibly optimal locations to place the speakers in the room 9, without the need for reading a manual of the speaker set and using measurement tools to measure distances and angles for finding the locations as recommended by the manual. By virtue of displaying the virtual seat and the virtual display screen, the user may use the virtual seat and the virtual display screen as referential objects to identify the recommended speaker locations in the real world more easily from virtual reality.

Figure 7:
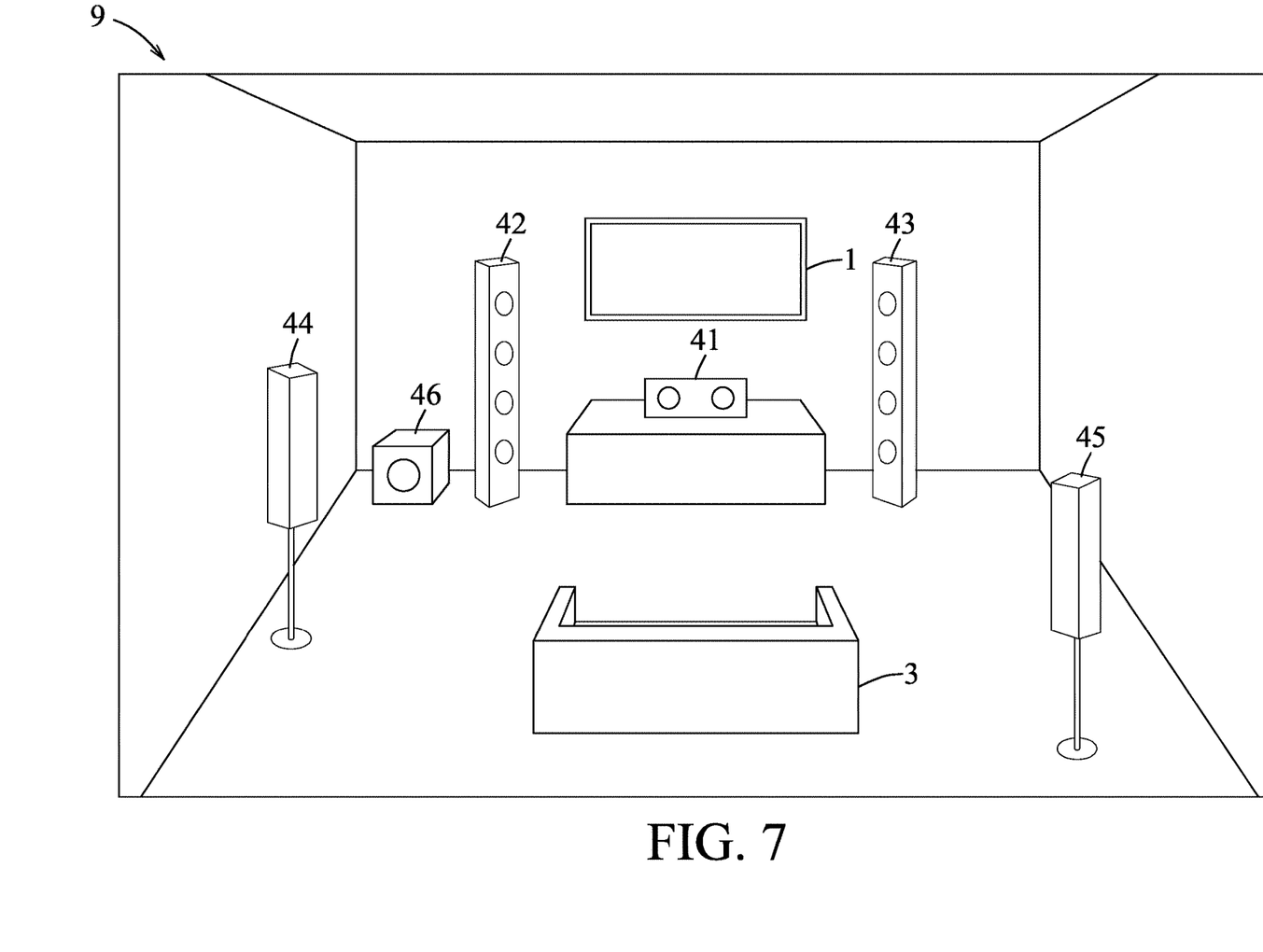
FIG. 7 is a perspective view illustrating a room of a second scenario.

FIG. 7 illustrates a second scenario of the embodiment, where the speaker set has been placed in the room 9 before acquisition of the room image set. As a result, the image(s) of the interior of the room 9 (i.e., the room image set) captured in step S02 may show the speakers of the speaker set that are currently in the room 9, and the computerized device 1 may identify the speakers from the room image set through image recognition or manual operation of the user, and thus determine current locations of the speakers in the room 9 in step S03. Accordingly, the 3D interior information may indicate the current locations of the speakers. In the illustrative embodiment, the speaker set is exemplified as a 5.1-channel speaker set that includes a center speaker 41, a left speaker 42, a right speaker 43, a rear-left speaker 44, a rear-right speaker 45 and a sub-woofer speaker 46.

Figure 8:
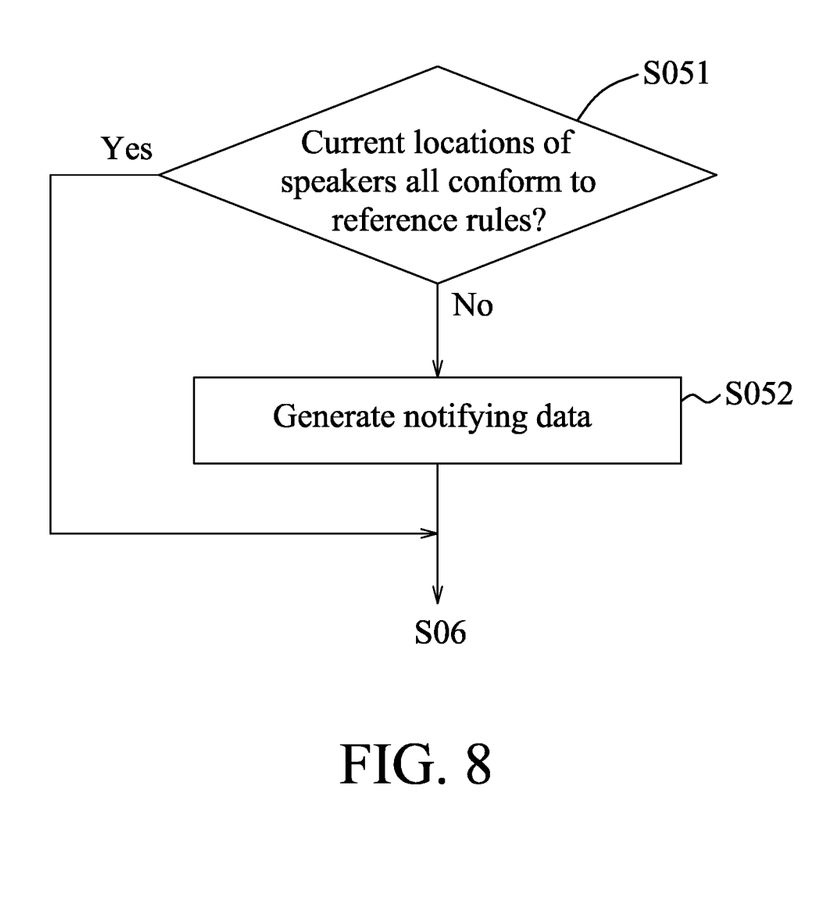
FIG. 8 is a flow chart illustrating sub-steps of step S05 in FIG. 4.

In the second scenario, the computerized device 1 can generate the speaker placement recommendation and cooperate with the wearable display 2 to present the speaker placement recommendation in a manner as described with respect to the first scenario. In some embodiments, the speaker placement recommendation may be generated and presented in different manners with respect to the second scenario. In one example, step S05 includes sub-steps S051-S052, as illustrated in FIG. 8. In sub-step S051, the computerized device 1 determines, for each of the speakers, whether the current location of the speaker conforms to the reference rules.

In one example, for each of the specific speakers, the computerized device 1 may use trigonometric functions to determine, based on the room image set, an angular distance between the current location of the speaker and the reference location as viewed from the seating location, and determine whether the angular distance falls within the recommended angular range for the speaker. When the angular distance does not fall within the recommended angular range for the speaker, the computerized device 1 determines that the current location of the speaker does not conform to the reference rules.

In one example, the computerized device 1 may determine the recommended speaker regions respectively for placing the specific speakers in the room 9, as described with respect to the first scenario, and determine, for each of the specific speakers, whether the current location of the speaker falls within the corresponding one of the recommended speaker regions. When the current location of the speaker does not fall within the corresponding recommended speaker region, the computerized device 1 determines that the current location of the speaker does not conform to the reference rules.

Upon determining that the current location or locations of one or more of the speakers do not conform to the reference rules, in sub-step S052, the computerized device 1 generates notifying data, which indicate nonconformity of the reference rules, only for said one or more of the speakers, and the speaker placement recommendation includes the notifying data.

Figure 9:
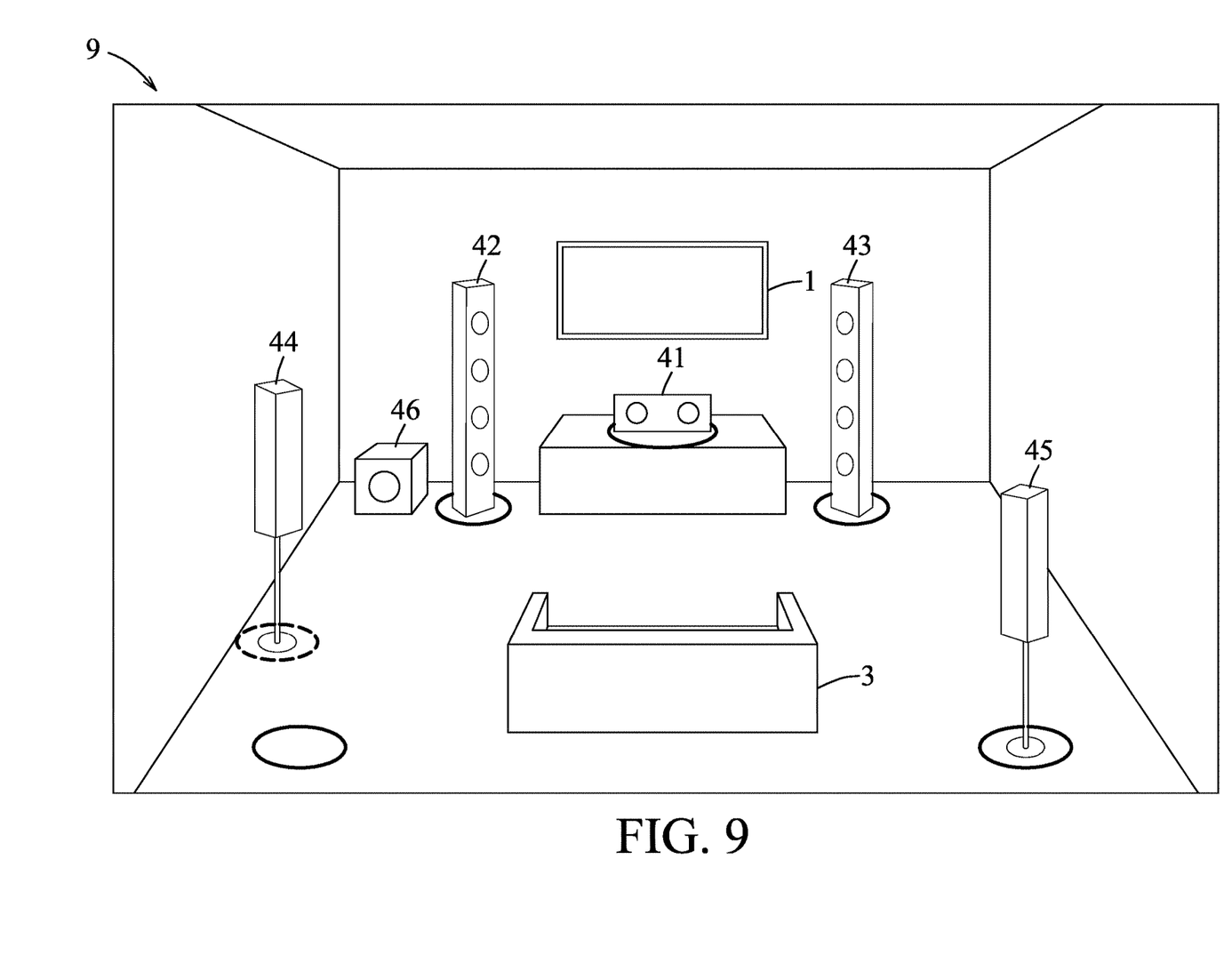
FIG. 9 is a perspective view exemplarily illustrating display of a speaker placement recommendation in augmented reality or virtual reality.

In step S06, the wearable device 2 obtains the speaker placement recommendation including the notifying data from the computerized device 1, and displays the speaker placement recommendation in augmented reality or virtual reality, with said one or more of the speakers being highlighted based on the notifying data, so as to indicate that said one or more of the speakers do not conform to the reference rules. Further, the wearable device 2 may display, among all the recommended speaker regions, only the recommended speaker region(s) for placing said one or more of the speakers (whose current locations do not conform to the reference rules) in the room 9 in augmented reality or virtual reality. As exemplified in FIG. 9, the current location of the rear-left speaker 44 does not conform to the reference rules, so the rear-left speaker 44 is highlighted using a dotted circle, while the recommended speaker region for placing the rear-left speaker 44 is enclosed by a solid line. In one example, the circle highlighting the rear-left speaker 44 may be presented in a color (e.g., red color) different from a color (e.g., green color) of the line enclosing the recommended speaker region. In one example, the circle highlighting the rear-left speaker 44 blinks, while the line enclosing the recommended speaker region does not. By virtue of highlighting said one or more of the speakers whose current locations do not conform to the reference rules, the user can clearly know which one or ones of the speakers need to be adjusted in terms of positioning. By virtue of showing only the recommended speaker region(s) for placing said one or more of the speakers, the user can focus on the speaker(s) that has (have) not been placed in the recommended region(s).

In summary, the embodiment of this disclosure uses the computerized device 1 that stores the reference rules of speaker arrangement to determine recommended speaker locations, and uses the wearable display 2 to show the speaker placement recommendation with respect to the room 9 in augmented reality or virtual reality, so the user does not have to read the manual of the speaker set and use measurement tools to find out the recommended speaker locations in the room 9.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for advising placement for a speaker set in a room, comprising steps of:

by a computerized device, obtaining speaker data of the speaker set that includes a plurality of speakers, the speaker data indicating a quantity of the speakers, and a speaker type of each of the speakers, wherein the computerized device stores reference rules of arrangement with respect to the speakers of the speaker set;

by the computerized device, obtaining a room image set that includes one or more images relating to an interior of the room, and acquiring interior information of the room based on the room image set;

by the computerized device, determining, based on the interior information of the room, a seating location where a user is to stay when listening to sounds outputted by the speaker set in the room, and a reference location that is spaced apart from the seating location in a facing direction that the user is to face when seated at the seating location listening to the sounds;

by the computerized device, generating a speaker placement recommendation with respect to the placement of the speaker set in the room based on the reference rules, the speaker data, the seating location and the reference location, the speaker placement recommendation being related to recommended speaker regions for placing the speakers in the room; and by a wearable display, obtaining the speaker placement recommendation from the computerized device, and displaying the speaker placement recommendation with respect to the room in augmented reality or virtual reality, wherein the room image set shows the speakers that are currently in the room, and the acquiring the interior information of the room includes identifying the speakers from the room image set, and determining current locations of the speakers in the room;

wherein the step of generating a speaker placement recommendation includes:

by the computerized device, determining, for each of the speakers, whether the current location of the speaker conforms to the reference rules; and by the computerized device, upon determining that the current location or locations of one or more of the speakers do not conform to the reference rules, generating notifying data only for said one or more of the speakers, wherein the notifying data indicates nonconformity of the references rules, and the speaker placement recommendation includes the notifying data; and wherein the step of displaying the speaker placement recommendation includes highlighting said one or more of the speakers in augmented reality or virtual reality based on the notifying data, so as to indicate that said one or more of the speakers do not conform to the reference rules.

2. The method as claimed in claim 1, wherein the room image set shows a seat in the room, and the acquiring the interior information of the room includes identifying the seat from the room image set, and determining a location of the seat in the room; and
wherein the seating location is determined by making the location of the seat in the room serve as the seating location.

3. The method as claimed in claim 1, wherein the room image set shows a display screen in the room, and the acquiring the interior information of the room includes identifying the display screen from the room image set, and determining a location of the display screen in the room; and
wherein the reference location is determined by making the location of the display screen serve as the reference location.

4. The method as claimed in claim 1, wherein the step of displaying the speaker placement recommendation includes displaying the recommended speaker regions in the room in augmented reality or virtual reality.

5. The method as claimed in claim 1, wherein each of the recommended speaker regions has a central point and a boundary, where the central point is spaced apart from the seating location by a distance equaling a distance between the seating location and the reference location, and a distance between the boundary and the central point is smaller than the distance between the seating location and the reference location, and is defined based on the reference rules or a distance between the central point and the seating location.

6. The method as claimed in claim 1, wherein the reference rules include, for some of the speakers of the speaker set, a recommended angular range relative to the facing direction; and
wherein the determining, for each of the speakers, whether the current location of the speaker conforms to the reference rules includes, for each of said some of the speakers:
determining, based on the room image set, an angular distance between the current location of the speaker and the reference location as viewed from the seating location; and
determining whether the angular distance falls within the recommended angular range for the speaker.

7. The method as claimed in claim 1, wherein the reference rules include, for some of the speakers of the speaker set, a recommended angular range relative to the facing direction; and
wherein the determining, for each of the speakers, whether the current location of the speaker conforms to the reference rules includes, for each of said some of the speakers:
determining whether the current location of the speaker falls within one of the recommended speaker regions for placing the speaker.

8. The method as claimed in claim 1, wherein the wearable display includes a camera unit, the computerized device is a television that is disposed at the reference location in the room and that is electrically connected to the speakers, and said method further includes a step of:
by the camera unit, capturing the one or more images of the room image set, and transmitting the room image set to the television.

9. A system for advising placement for a speaker set in a room, characterized by a computerized device and a wearable display that is communicatively connected to said computerized device, wherein said computerized device and said wearable display are configured to cooperatively perform the method as claimed in claim 1.

10. A method for advising placement for a speaker set in a room, comprising steps of:
by a computerized device, obtaining speaker data of the speaker set that includes a plurality of speakers, the speaker data indicating a quantity of the speakers, and a speaker type of each of the speakers, wherein the computerized device stores reference rules of arrangement with respect to the speakers of the speaker set;
by the computerized device, obtaining a room image set that includes one or more images relating to an interior of the room, and acquiring interior information of the room based on the room image set;
by the computerized device, determining, based on the interior information of the room, a seating location where a user is to stay when listening to sounds outputted by the speaker set in the room, and a reference location that is spaced apart from the seating location in a facing direction that the user is to face when seated at the seating location listening to the sounds;
by the computerized device, generating a speaker placement recommendation with respect to the placement of the speaker set in the room based on the reference rules, the speaker data, the seating location and the reference location, the speaker placement recommendation being related to recommended speaker regions for placing the speakers in the room; and
by a wearable display, obtaining the speaker placement recommendation from the computerized device, and displaying the speaker placement recommendation with respect to the room in augmented reality or virtual reality,
wherein the room image set shows the speakers that are currently in the room, and the acquiring the interior information of the room includes identifying the speakers from the room image set, and determining current locations of the speakers in the room based on the room image set;
wherein the step of generating a speaker placement recommendation includes:
by the computerized device, determining, for each of the speakers, whether the current location thereof conforms to the reference rules; and
by the computerized device, upon determining that the current locations or locations of one or more of the speakers do not conform to the reference rules, generating notifying data only for said one or more of the speakers, wherein the notifying data indicates nonconformity of the references rules, and the speaker placement recommendation includes the notifying data; and
wherein the step of displaying the speaker placement recommendation includes highlighting said one or more of the speakers in augmented reality or virtual reality based on the notifying data so as to indicate that said one or more of the speakers do not conform to the reference rules, and displaying, among all the recommended speaker regions, only the recommended speaker region(s) for placing said one or more of the speakers in the room in augmented reality or virtual reality.

11. A system for advising placement for a speaker set in a room, characterized by a computerized device and a wearable display that is communicatively connected to said computerized device, wherein said computerized device and said wearable display are configured to cooperatively perform the method as claimed in claim 10.

\* \* \* \* \*